United States Patent [19]
Morrison

[11] Patent Number: 6,021,486
[45] Date of Patent: Feb. 1, 2000

[54] CONTINUED PROCESSING OF OUT-OF-ORDER NON-ARCHITECTUAL OPERATIONS UPON EXCEPTIONS UNTIL FLUSHING BY ARCHITECTUAL OPERATIONS EXCEPTIONS TO AVOID RESUME DEADLOCK

[75] Inventor: Michael James Morrison, Santa Clara, Calif.

[73] Assignee: Intel Corporation, Santa Clara, Calif.

[21] Appl. No.: 08/941,143

[22] Filed: Sep. 30, 1997

[51] Int. Cl.[7] ...................................................... G06F 9/38
[52] U.S. Cl. ............................ 712/218; 712/23; 712/244
[58] Field of Search .................................... 395/390, 392, 395/591, 800.23; 712/23, 218, 244

[56] References Cited

U.S. PATENT DOCUMENTS

| 5,193,158 | 3/1993 | Kinney et al. | 712/244 |
| 5,655,096 | 8/1997 | Branigin | 395/376 |
| 5,664,138 | 9/1997 | Yoshida | 712/219 |
| 5,784,606 | 7/1998 | Hoy et al. | 395/591 |
| 5,805,849 | 9/1998 | Jordan et al. | 395/390 |
| 5,850,533 | 12/1998 | Panwar et al. | 395/392 |

*Primary Examiner*—Kenneth S. Kim
*Attorney, Agent, or Firm*—Blakely, Sokoloff, Taylor & Zafman LLP

[57] ABSTRACT

A data processing device having an apparatus to execute operations out-of-order. The apparatus having an execution unit to execute the set of operations out-of-order. The execution unit, upon executing an operation that generates a first exception, continues to execute operations out-of-order, to avoid deadlock, until an operation of a first type is to be executed. The execution unit flushes a pipeline once the operation of the first type is to be executed.

16 Claims, 3 Drawing Sheets

CONTINUED PROCESSING OF OUT-OF-ORDER NON-ARCHITECTUAL OPERATIONS UPON EXCEPTIONS UNTIL FLUSHING BY ARCHITECTUAL OPERATIONS EXCEPTIONS TO AVOID RESUME DEADLOCK

BACKGROUND OF THE INVENTION

1. Field of the Invention

The invention relates to the field of data processing systems. More specifically, the invention relates to exception processing and out-of-order execution in data processing systems.

2. Background Information

Performance of data processing systems may be improved by executing certain operations out-of-order, relative to in-order (i.e., original program order) execution (hereinafter, operation is used generally to refer to microoperations, macrooperations, instructions, etc.). For example, consider the following in-order sequence of operations in TABLE 1. As shown, the first column indicates the original program ordering of the operations in the sequence:

TABLE 1

| ORDER | OPERATION | DESCRIPTION |
| --- | --- | --- |
| 1 | LOAD [MEM1], X; | Load value from memory to register X |
| 2 | LOAD [MEM2], Y; | Load value from memory to register Y |
| 3 | INCR Z; | Increment value of register Z |
| 4 | ADD Y, X; | Add Y to X, place result in X |
| 5 | ADD Z, X; | Add Z to X, place result in X |
| 6 | ST [MEM3], X; | Store the result in X to memory |

The first two operations in the sequence to be executed, operation 1 and operation 2 (loads from memory), may require similar (shared) resources, such as address decode logic, memory bus, etc. Moreover, operation 3 in the sequence (INCR Z) does not depend on the previous operations and may not require the same resources. Thus, operation 3 may be performed concurrently (at least in part) with operation 1 or operation 2, for example.

Thus, to achieve relatively greater parallelism, thereby improving efficiency, the in-order sequence shown in TABLE 1 may be scheduled to be executed out-of-order, as shown in the example of TABLE 2. As shown in TABLE 2, the third operation in the in-order sequence is scheduled to be executed immediately following the first operation to achieve relatively greater parallelism over execution of the in-order sequence shown in TABLE 1.

Machines that perform out-of-order execution may employ a mechanism to recover original program order subsequent to out-of-order execution. Typically, a reorder buffer (sometimes referred to as a reorder/retire queue/stack) is utilized to retire operations in original program order, subsequent to out-of-order execution. A reorder buffer may operate with some retirement/reorder logic, including, for example, a reorder stack pointer, to retire the operations in original program order. Thus, a reorder buffer may help recover original program order subsequent to out-of-order execution.

TABLE 2

| ORDER | OPERATION | DESCRIPTION |
| --- | --- | --- |
| 1 | LOAD [MEM1], X; | Load value from memory to register X |
| 3 | INCR Z; | Increment value of register Z |
| 2 | LOAD [MEM2], Y; | Load value from memory to register Y |
| 4 | ADD Y, X; | Add Y to X, place result in X |
| 5 | ADD Z, X; | Add Z to X, place result in X |
| 6 | ST [MEM3], X; | Store the result in X to memory |

Unfortunately, not all operations may be executed out-of-order. In particular, operations that may cause exceptions and/or unrecoverable side effects may be limited to strict (in-order) program ordering. Operations that are limited to program (in-order) ordering are referred to as "architectural" operations. Typically, operations which result in side effects which may not be rolled back (i.e., undone) are considered as architectural operations (e.g., store issue to memory). In machines which utilize "architectural ordering," operations preceding architectural operations (in the original program order) may be executed out-of-order relative to each other, but should be executed prior to execution of the particular architectural operations. Moreover, architectural operations should typically be executed in strict program order with respect to other architectural operations in machines which utilize architectural ordering.

One example of an operation that is typically considered architectural is a store operation. It is apparent from the example sequence of operations shown in TABLEs 1 and 2 that the value that is stored by the store operation 6 depends on the completed result of the previous operations 1–5. Thus, if the store operation 6 is executed out-of-order relative to operations 1–5 that precede operation 6 in the sequence (e.g., executed between operations 3 and 4) an incorrect/incomplete value would be stored in the memory location [MEM3]. Accordingly, the store operation should be executed subsequent to operations 1–5.

Operations that may cause exceptions may also be considered architectural, since out-of-order execution of such operations may cause a "deadlock," which is described by way of the following example. Consider the sequence of operations in TABLEs 3 and 4:

TABLE 3

| ORDER | OPERATION | DESCRIPTION |
| --- | --- | --- |
| 1 | ST 1; | Store operation |
| 2 | ST 2; | Store operation |
| 3 | FP 1; | (Excepting) Floating point operation |

As shown in TABLE 3, the first two operations (ST 1 and ST 2) are store operations, and thus, may be considered architectural, and ordered accordingly (e.g., ST 2 may not be executed prior to ST 1). The third operation is a floating point operation that encounters an exception. To illustrate deadlock, consider first the case where FP 1 is not considered architectural, and thus, may be executed out-of-order. TABLE 4 illustrates this first case. As shown, FP 1 is re-ordered to be executed after ST 1 and before ST 2.

TABLE 4

| ORDER | OPERATION | DESCRIPTION |
| --- | --- | --- |
| 1 | ST 1; | Store operation |
| 3 | FP 1; | (Excepting) Floating point operation |
| 2 | ST 2; | Store operation |

In response to the exception caused by FP 1, the pipeline may be "flushed" upon execution of FP 1 (i.e., one or all of the operations following FP 1 would be aborted in the pipeline, which operation in the given example is ST 2). However, if the pipeline is flushed upon causing the exception encountered by FP 1, retirement logic may not be able to resume execution with FP 1 since ST 2 (which is architecturally ordered) has not yet been executed. Additionally, ST 2 will have been flushed. As a result, a state of "deadlock" may occur, in which state the data processing system is unable to determine at which operation execution is to resume without skipping over and/or re-executing one or more operations.

Although one technique to address the above-mentioned difficulties may be to always architecturally order operations that may cause exceptions (e.g., floating point operations), such a solution may significantly degrade performance. This is especially true, since certain excepting operations (i.e., operations that may cause an exception), such as floating point operations, may often lie within a routine's critical path.

Thus, it is desirable to allow one or more types of operations that may cause an exception to be scheduled out-of-order, while avoiding the above-described effects (e.g., deadlock).

SUMMARY OF THE INVENTION

According to one aspect of the invention a method for out-of-order processing of excepting operations is provided. In one embodiment, information indicating an ordering of a set of operations in a program order is stored, wherein the set of operations comprises at least a first operation that encounters an exception. The first operation is scheduled out-of-order relative to the program order. Upon processing the first operation, a state of the data processing device is determined based on the information that indicates the ordering of the first operation in the program order.

According to another aspect of the invention, an apparatus is provided to store information indicating an ordering of each of a plurality of operations in a sequence. The apparatus includes logic to determine a state of the data processing device based on the information, upon detection of an operation of a first type.

DETAILED DESCRIPTION

A method and apparatus is provided for allowing one or more types of operations that may encounter an exception to be scheduled out-of-order (scheduled is used herein to refer to one or more stages of processing, such as issuance, decoding, execution, retirement, etc.). According to one aspect of the invention, a relative "age" of operations that may cause an exception and/or are architectural operations are compared to determine a state of a data processing device (e.g., whether to flush the pipeline, discard an exception, indicate an exception as pending, etc.).

In the following description, numerous specific details are set forth to provide a thorough understanding of the invention. However, it is understood that the invention may be practiced without these specific details. In other instances, well-known circuits, structures and techniques have not been shown in detail to avoid obscuring the invention.

Figure 1:
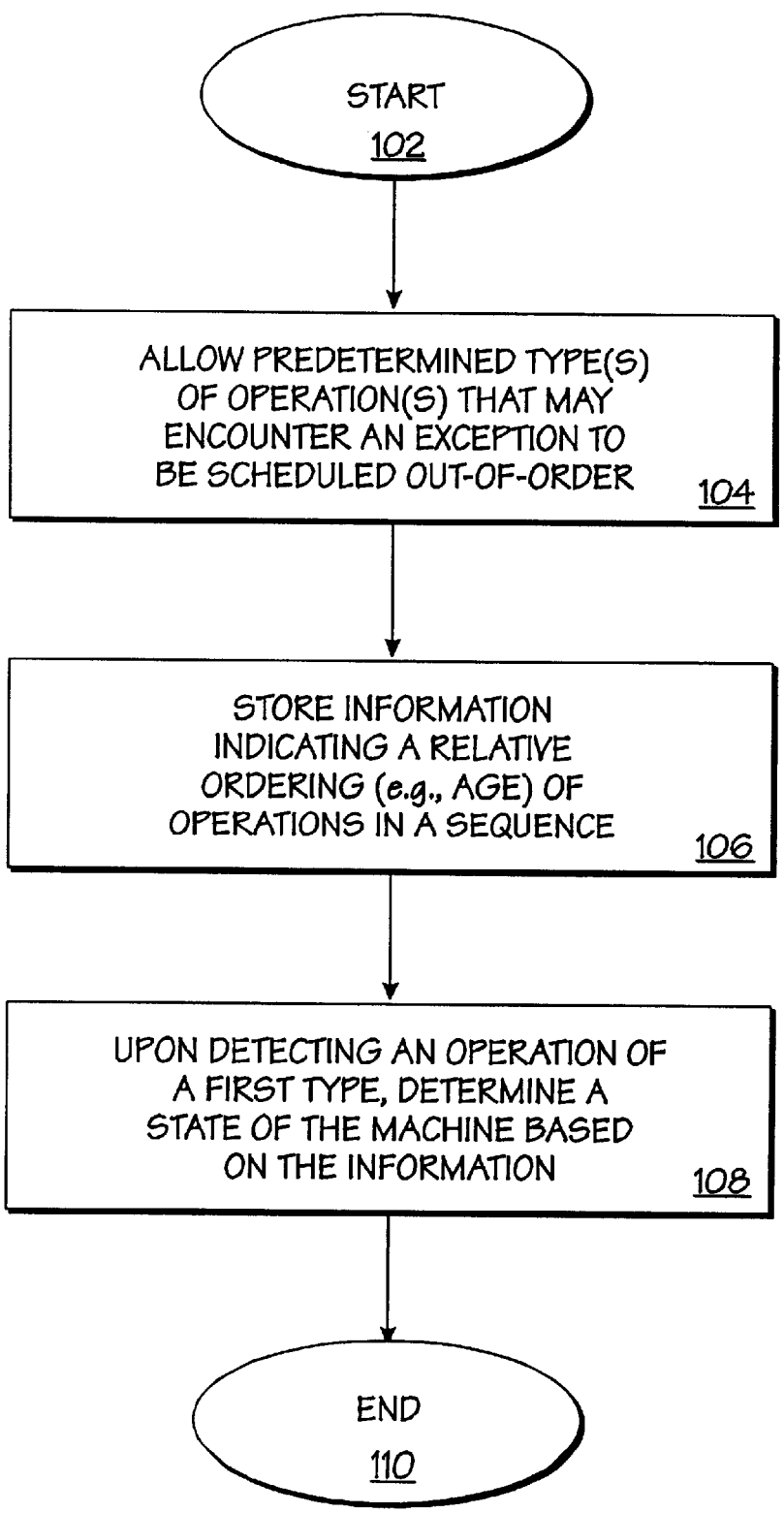
FIG. 1 is a flow diagram illustrating a method for processing operations that encounter exceptions in an out-of-order data processing system, according to one embodiment of the invention.

FIG. 1 is a flow diagram illustrating a method for processing operations that may cause exceptions in an out-of-order data processing system. In FIG. 1, flow begins at step 102 and ends at step 110. From step 102, flow passes to step 104.

In step 104, certain types of operations which may cause exceptions are scheduled out-of-order, and flow passes to step 106. In one embodiment, such operations include floating point operations. In an alternative embodiment, one or more other types of operations that may cause exceptions are allowed to be scheduled out-of-order (e.g., address generation, floating point, etc.).

In step 106, information indicating a relative ordering of operations is stored, and flow passes to step 108. In one embodiment, such information includes a relative "age" in the original program and/or retirement sequence, as described in further detail below with reference to one embodiment of the invention shown in FIG. 2.

In step 108, an operation of a first type is detected, upon which the state of the data processing device is determined (e.g., whether to flush the pipeline, discard an exception, indicate a pending exception, etc.), and flow passes to step 110. In one embodiment, the operation of the first type may be an architectural operation or an operation that encounters an exception (however, it should be noted that some architectural operations may also, but do not necessarily, encounter an exception).

As described with reference to FIG. 2, in one embodiment of the invention, the age value and/or the type of operation (e.g., architectural, out-of-order excepting operation, excepting architectural operation, etc.) may further be utilized in step 108 to determine, upon detection of a predetermined type(s) of operation, whether to flush the pipeline. As will be apparent from the description that follows, according to one aspect of the invention, certain types of excepting operations may be scheduled (e.g., for execution) out-of-order without causing deadlock or certain other undesirable effects, by determining a state of the data processing machine based on the type and/or determination of a relative ordering of operations.

Figure 2:
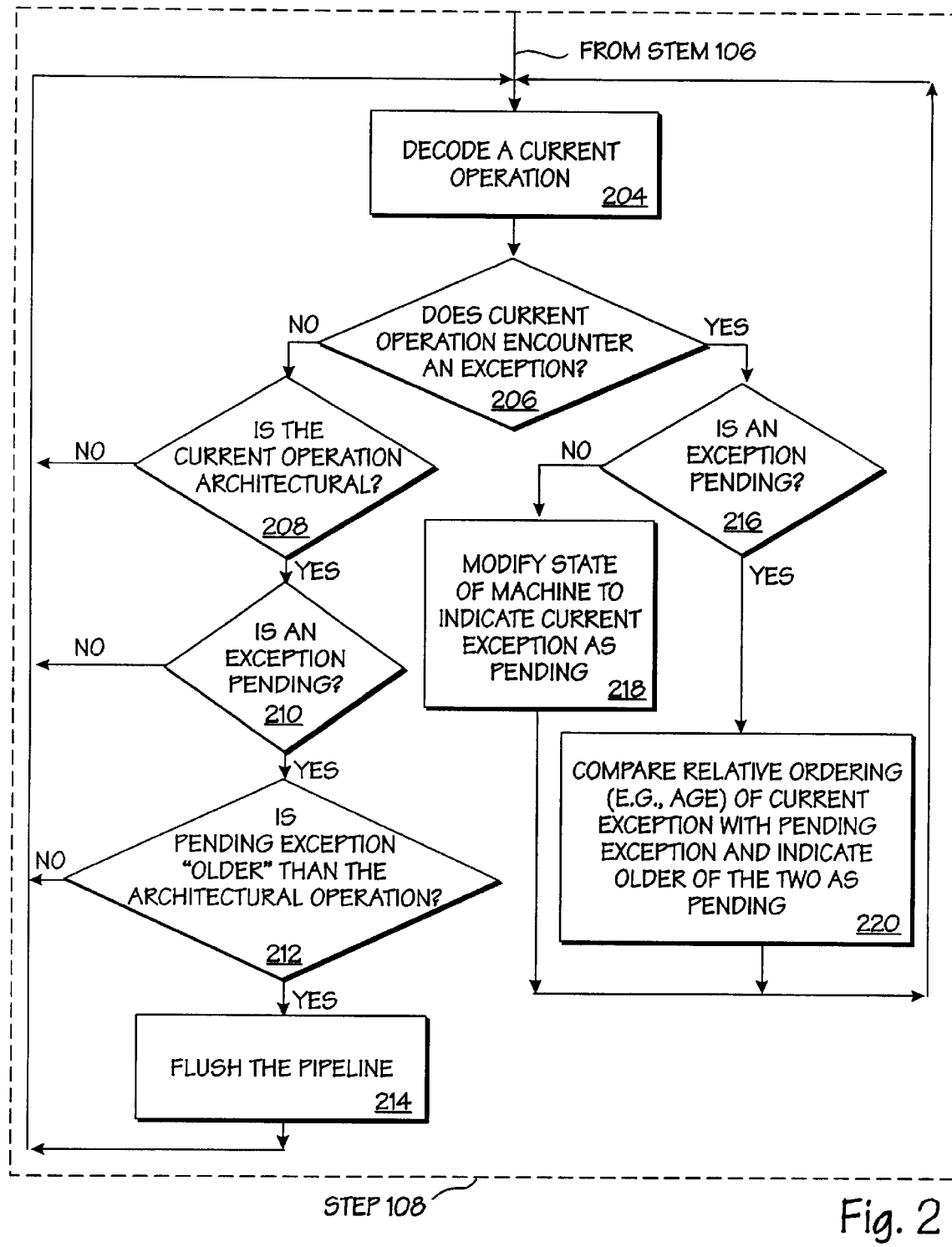
FIG. 2 is a flow diagram illustrating a method for exception sequencing in an out-of-order data processing system according to one embodiment of the invention.

FIG. 2 is a flow diagram illustrating a method for exception sequencing in an out-of-order data processing system according to one embodiment of the invention. In FIG. 2, flow passes from step 106 of FIG. 1 to step 204.

As briefly described above, in step 106, information indicating a relative ordering of a set of operations are stored. In one embodiment, the age of a set of operations, relative to architectural operations in a program sequence, may be stored. In one embodiment, a finite machine stores age values in a manner as shown in TABLE 5. As shown in TABLE 5, in one embodiment of the invention, each architectural operation may be assigned a new "age" value, and other (non-architectural) operations subsequent to the architectural operation and previous to the next architectural operation may be assigned the same age value. The next architectural operation may be assigned the age value of the previous architectural operation incremented by one.

TABLE 5

| AGE VALUE | OPERATION | DESCRIPTION |
|---|---|---|
| 0 | A | Excepting Operation |
| 0 | B | Non-Architectural/Non-Excepting Op. |
| 1 | C | Architectural Operation |
| 1 | D | Excepting Operation |
| 2 | E | Architectural Operation |
| 2 | F | Excepting Operation |
| 3 | G | Architectural Operation |
| 4 | H | Architectural Operation |
| 5 | I | Architectural Operation |

As shown in TABLE 5, the first two operations, A and B, are assigned an age value of zero. The first architectural operation, C, changes the age value to one. As such, the next non-architectural operation, D, also acquires the same age value of one. However, the next architectural operation, E, again changes the age value to acquire an age value of two, and so forth. Throughout this description, a first operation that follows a second operation in the original program order is considered to be younger, and thus, the first operation would typically correspond to a higher age value than the second operation.

Thus, in one embodiment, architectural operations, as ordered in original program order (i.e., in-order), are used to assign information (e.g., age values) indicating a relative ordering of operations. In alternative embodiments, other criteria could be used to indicate relative ordering of operations. Furthermore, age values may be assigned in ascending or descending order, relative to the original program ordering.

In step 204, a current operation is decoded, and flow passes to step 208. In one embodiment, non-architectural operations are ordered arbitrarily (e.g., out-of-order relative to a program order), while architectural operations are in program order with respect to one another.

In step 206, it is determined whether the current operation encounters an exception. In one embodiment, tracking logic may track each operation flowing through a pipeline. In another embodiment, a flush of the pipeline or other action maybe performed speculatively, upon detection of an excepting operation. If the current operation encounters an exception, flow passes to step 216. Otherwise, flow passes to step 208.

In step 208, if it is determined that the current operation is architectural, flow passes to step 210. Otherwise, flow passes back to step 204.

In step 210, if another exception is pending, flow passes to step 212. Otherwise, flow passes back to step 204. In one embodiment, operations that may cause an exception (e.g., floating point operations, address generation, etc.) and have been may scheduled out-of-order (e.g., see step 104 of FIG. 1) may not always cause flushing of the pipeline, as may other excepting operations. Rather, the data processing machine enters a state where a non-architectural exception is considered pending, as described further below with reference to steps 218 and 220 of FIG. 2.

In step 212, if the pending exception is "older" than the architectural operation (e.g., has a lower age value, according to the embodiment described with reference to TABLE 5 above), flow passes back to step 204. Otherwise, flow passes to step 214.

In step 214, the pipeline is flushed.

As mentioned above, if in step 206 it is determined that the current operation encounters an exception, flow passes to step 216.

In step 216, it is determined whether another exception is "pending." If another exception is pending, flow passes to step 220. Otherwise, flow passes to step 218.

In step 220, the age value of a previous pending excepting operation is compared with the age value of the current excepting operation. The older one (e.g., with the lowest age value) is retained as pending, and the younger of the two exceptions is discarded (e.g., not maintained as "pending"). From step 220, flow passes back to step 204.

In step 218, the state of the machine is modified to indicate that the current exception is "pending." In other words, the exception may be deferred or altogether discarded (e.g., depending on types and/or ages of subsequent operations to enter the pipeline). Thus, the pipeline may not be flushed in response to the encountered exception.

In one embodiment, a finite state machine may store information to indicate that an exception is pending. Moreover, the age of the pending exception may also be stored. In alternative embodiments of the invention, a register, buffer, or other storage area may be utilized to indicate a pending exception and/or information about a pending exception.

To aid in the understanding of one embodiment of the invention as described with reference to FIG. 2, consider the original program ordered sequence of operations described above with reference to TABLE 5, except reordered as shown below in TABLE 6.

TABLE 6

| AGE VALUE | OPERATION | DESCRIPTION |
|---|---|---|
| 0 | A | Excepting Operation |
| 2 | F | Excepting Operation |
| 0 | B | Non-Architectural/Non-Excepting Op. |
| 1 | C | Architectural Operation |
| 1 | D | Excepting Operation |
| 2 | E | Architectural Operation |
| 3 | G | Architectural Operation |
| 4 | H | Architectural Operation |
| 5 | I | Architectural Operation |

As shown in TABLE 6, operation F is re-ordered between operations A and B. Both A and F are excepting operations (e.g., A and F may be floating point operation, address generation, or other types of operations that encounter exceptions). Initially, operation A causes a "pending" exception to be stored (e.g., see FIG. 2, steps 218). When operation F is executed, an exception is again detected, but the exception corresponding to A is maintained and the exception corresponding to F is discarded, since F is younger than A (e.g., F has a larger age value than A). B is neither an excepting operation nor an architectural operation, and is executed subsequent to F. As C enters the pipeline, an architectural operation that is younger than the pending exception is detected (e.g., FIG. 2, step 212), and the pipeline is flushed before C can be executed.

As a result, execution may resume with operation C after handling the exception caused by A, and a dead lock may be avoided even in the presence of excepting operations being issued and/or executed out-of-order.

In one embodiment, if an architectural operation has not already caused a flush, then an operation whose exception is pending will cause a flush upon retirement.

Figure 3:
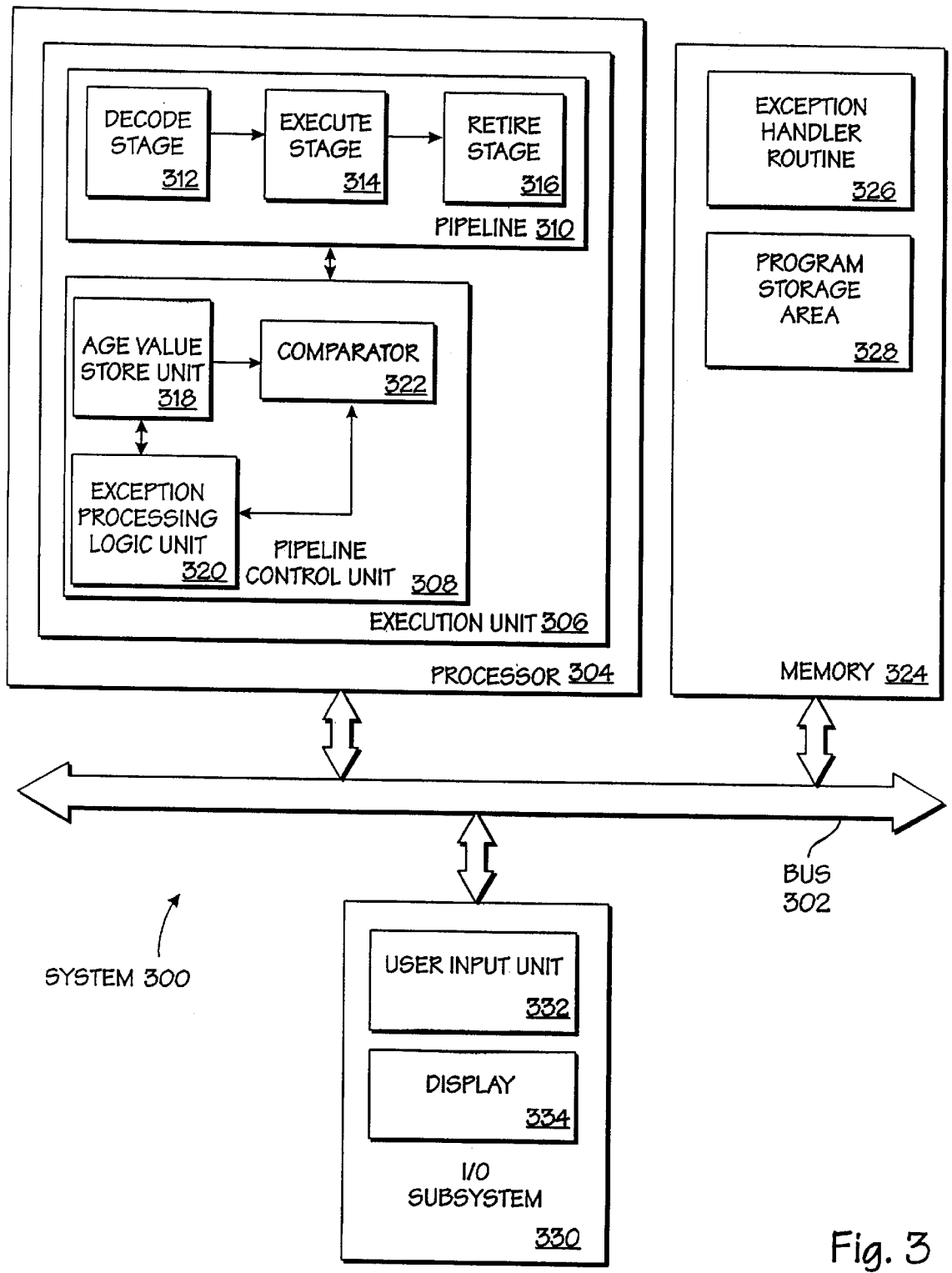
FIG. 3 is a block diagram of a computer system employing pipeline control circuitry that provides exception sequencing according to one embodiment of the invention.

FIG. 3 is a block diagram of a computer system employing pipeline control circuitry that provides exception sequencing according to one embodiment of the invention. In FIG. 3, a system 300 is shown, which includes a bus 302, coupled to a processor 304, a memory 324, and an input/output (I/O) subsystem 330.

The I/O subsystem 330 includes a user input unit 332 and a display 334. The user input unit 332 may represent one or more devices for providing input signals to the system 300 (e.g., keyboard, mouse, trackball, etc.).

As shown, the processor 304 includes an execution unit 306. The execution unit 306 performs overlapping or pipelined processing, as depicted by a pipeline 310. As shown, the pipeline 310 includes three stages: a decode stage 312, an execution stage 314, and a retire stage 316. It should be understood that the pipeline 310 is shown for illustrative purposes, and as such, may include different types and numbers of pipe stages. Furthermore, one or more stages may share circuitry, control signals, storage areas, etc., not shown in FIG. 3.

A pipeline control unit 308 is shown coupled to the pipeline 310. The pipeline control unit 308 includes logic to provide exception sequencing, such as described with reference to one embodiment shown in FIG. 2. In one embodiment of the invention, the pipeline control unit 308 includes an age value store unit 318 coupled to a exception processing logic unit 308 and a comparator 322. In one embodiment, the age value store unit 318 may store information, such as a set of one or more values, to indicate a relative ordering of a set of operations to enter the pipeline 310. The age values, in one embodiment, are assigned in a manner described above with reference to TABLE 5, in which each value indicates an age of an operation relative to architectural operations in a program sequence. In alternative embodiments, age values may be assigned according to various other criteria to indicate a relative ordering of operations and/or exceptions. In one embodiment, the age value store unit 318 includes a finite state machine to store a set of one or more age values of operations. In alternative embodiments, several types and combinations of storage devices/media may be utilized by the age value store unit 318 to store age values (e.g. DRAM, SRAM, etc.). Age values may be assigned to operations by circuitry, instructions (e.g, compiler, microcode, operating system, etc.), or combination thereof.

The exception processing logic unit 308 may monitor the pipeline 310 to detect various types of operations, exceptions, etc. As such, in response to detection of a predetermined type of operation (e.g., an architectural operation, an excepting non-architectural operation, etc.) by the exception processing logic unit 308, the comparator 322 may compare the age value of the operation with a previously pending excepting operation. For example, in one embodiment, in response to detection of an architectural operation or an excepting operation (which may also be architectural), the comparator 320 may compare the age value of the current operation with a previously detected operation that causes an exception. In response to the comparison, the exception processing logic unit 308 may, for example, provide a flush signal to flush the pipeline 310, or cause one of a currently detected and a pending exception to be discarded.

As shown, the memory 324 includes an exception handler routine 326 and a program storage area 328. The exception handler routine 326 may be executed by the processor 304 upon flushing the pipeline 320 (e.g., in response to an exception).

While one embodiment of the invention has been described wherein the pipeline control unit 308 includes the age value store unit 318, the exception processing logic unit 308, and the comparator 322, alternative embodiments of the pipeline control unit may not include the age value store unit 318, the exception processing logic unit 308, and/or the comparator 322. Thus, alternative embodiments of the invention may utilize several types and combinations of circuitry and/or routines (e.g., microcode) to provide exception sequencing, as described, for example, with reference to FIG. 1 or the pipeline control unit 308. Furthermore, it should be appreciated that the invention is not limited to a particular type of data processing system.

ALTERNATIVE EMBODIMENTS

While the invention has been described in terms of several embodiments, those skilled in the art will recognize that the invention is not limited to the embodiments described. In particular, the invention can be practiced in several alternative embodiments that excepting operations to be scheduled (e.g., to be executed) out-of-order.

Therefore, it should be understood that the method and apparatus of the invention can be practiced with modification and alteration within the spirit and scope of the appended claims. The description is thus to be regarded as illustrative instead of limiting on the invention.

What is claimed is:

1. A method for executing operations in a data processing device comprising of:

executing a set of operations out-of-order, upon executing an operation that generates a first exception, continuing to execute operations out-of-order, to avoid deadlock, until an operation of a first type is to be executed, and flushing a pipeline once said operation of said first type is to be executed.

2. The method of claim 1, wherein the operation of the first type is an architectural operation.

3. The method of claim 2, wherein results generated by an architectural operation can not be undone.

4. The method of claim 3, wherein architectural operations modify an architectural state of a data processing device.

5. The method of claim 2, wherein architectural operations are executed in-order.

6. The method of claim 5, wherein the operation that generates the exception is a floating point operation.

7. The method of claim 5 further including the following steps:

in response to an operation generating an exception, storing in a first storage location, a first age value corresponding to the operation that generated the exception; and comparing an age value corresponding to the architectural operation with the age value stored in the first storage location;

in response to the age value of the architectural operation being greater than an age value stored in said first storage location, flushing the pipeline.

8. The method of claim 7 further including the following steps:

upon executing a second operation that generates a second exception, comparing a second age value corresponding to the second operation with the age value stored in said first storage location; and in response to the second age value having a lower value than the age value stored in said first storage location, replacing the age value stored in said first storage location with the second age value corresponding to the second operation that generates the second exception.

9. A data processing device having an apparatus to execute operations out-of-order, said apparatus comprising:

an execution unit to execute a set of operations out-of-order, said execution unit, upon executing an operation that generates a first exception, continues to execute operations out-of-order, to avoid deadlock, until an operation of a first type is to be executed, and said execution unit flushes a pipeline once said operation of said first type is to be executed.

10. The apparatus of claim 9, wherein the operation of the first type is an architectural operation.

11. The apparatus of claim 10, wherein results generated by an architectural operation can not be undone.

12. The apparatus of claim 11, wherein architectural operations modify an architectural state of a data processing device.

13. The apparatus of claim 10, wherein architectural operations are executed in-order.

14. The apparatus of claim 13, wherein the operation that generates the exception is a floating point operation.

15. The apparatus of claim 13 further including:

a first storage location to store a first age value corresponding to the operation that generated the exception, in response to said operation generating said exception; and a comparator to compare an age value corresponding to the architectural operation with the age value stored in the first storage location; and said execution unit flushing the pipeline in response to the age value of the architectural operation being greater than the age value stored in said first storage location.

16. The apparatus of claim 15, wherein said comparator compares a second age value, corresponding to a second operation that generates a second exception, with the age value stored in said first storage location; and said comparator, in response to the second age value having a lower value than the age value stored in said first storage location, replaces the age value stored in said first storage location with the second age value corresponding to the second operation that generates the second exception.

* * * * *